United States Patent
Bedont, Jr. et al.

(10) Patent No.: US 6,775,585 B2
(45) Date of Patent: Aug. 10, 2004

(54) METHOD AND DESIGNING AND MANUFACTURING RUBBER PROCESS TOOLING USING AN INTERFACE TO A CAD/CAM SOFTWARE PROGRAM

(75) Inventors: William James Bedont, Jr., Akron, OH (US); Gary Robert Burg, Massillon, OH (US); Donald Edward Helle, Poland, OH (US); Ernest Wilford Looman, Jr., Tallmadge, OH (US); Sylvie Catherine Evelyne Claire Dubru, Fairlawn, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/263,417

(22) Filed: Oct. 2, 2002

(65) Prior Publication Data

US 2004/0068342 A1 Apr. 8, 2004

(51) Int. Cl.[7] ................................................ G06F 19/00
(52) U.S. Cl. ........................... 700/182; 700/95; 700/97; 700/98; 700/159; 700/180; 700/181
(58) Field of Search ................................. 700/180, 182, 700/181, 159, 95, 97, 98

(56) References Cited

U.S. PATENT DOCUMENTS

| | | | |
|---|---|---|---|
| 5,453,933 A | * | 9/1995 | Wright et al. ................ 700/182 |
| 5,762,740 A | * | 6/1998 | Benzing et al. ............. 156/133 |
| 6,280,548 B1 | * | 8/2001 | Benzing et al. ............. 156/133 |
| 6,397,117 B1 | | 5/2002 | Burrows et al. |
| 2001/0047251 A1 | | 11/2001 | Kemp |
| 2002/0010522 A1 | | 1/2002 | Martin |
| 2002/0012007 A1 | | 1/2002 | Twigg |
| 2002/0021277 A1 | | 2/2002 | Kramer et al. |
| 2002/0035451 A1 | | 3/2002 | Rothermel |
| 2002/0133252 A1 | * | 9/2002 | Landers et al. ................ 700/97 |

* cited by examiner

*Primary Examiner*—Leo Picard
*Assistant Examiner*—Charles Kasenge
(74) *Attorney, Agent, or Firm*—Howard M. Cohn

(57) ABSTRACT

An interface tool is provided for a user to interface with a CAD/CAM software package, such as Pro/ENGINEER (tm) which is resident on the client computer or on a second server computer. The interface tool is resident on the client computer. Parameters are input by the user onto web pages, and then are transferred to Pro/ENGINEER by the interface tool. Pro/ENGINEER outputs drawings, 3-D models and machining codes by using the information that was transferred from the interface tool. The user can create or modify, and verify from various aspects, models of machineable process tooling such as "preformers". Pro/ENGINEER can then create appropriate toolpaths and output the machining code for CNC (computerized numeric control) machines.

19 Claims, 1 Drawing Sheet

General Configuration Information

| Model: TREAD | | | |
|---|---|---|---|
| Model Name | Tread 01 | | |
| Select CNC Machine | MAHO | | |
| Extruder Line | QUAD 1 | | |
| Splice Bar Size | A | | |
| Splice Bar | Set 1 | | |
| Splice Bar Configurations | | | |
| Number of Cavities | 2 | | |
| Cavity Locations | | | |
| Cavity #1 100 mm | | Cavity #3 100 mm | |
| Cavity #1 ☒ All ☐ | Cavity #2 ☒ All ☐ | Cavity #3 ☒ All ☐ | Cavity #4 ☒ All ☐ |
| FEAT 1A ☒ | FEAT 1B ☐ | FEAT 1C ☐ | FEAT 1D ☐ |
| FEAT 2A ☒ | FEAT 2B ☐ | FEAT 2C ☐ | FEAT 2D ☐ |
| FEAT 3A ☒ | FEAT 3B ☐ | FEAT 3C ☐ | FEAT 3D ☐ |
| FEAT 4A ☒ | FEAT 4B ☐ | FEAT 4C ☐ | FEAT 4D ☐ |
| FEAT 5A ☒ | FEAT 5B ☐ | FEAT 5C ☐ | FEAT 5D ☐ |
| Special Features | | | |
| OPTION 1 ☐ | OPTION 2 ☐ | | OPTION 3 ☐ |

General Configuration Information

| Model: TREAD |||||
|---|---|---|---|---|
| Model Name | Tread 01 |||||
| Select CNC Machine | MAHO ▽ |||||
| Extruder Line | QUAD 1 ▽ |||||
| Splice Bar Size | A ▽ |||||
| Splice Bar | Set 1 ▽ |||||
| Splice Bar Configurations |||||
| Number of Cavities | 2 ▽ |||||
| Cavity Locations |||||
| Cavity #1<br>100 mm || Cavity #3<br>100 mm |||
| Cavity #1 ☑<br>All ☐<br><br>FEAT 1A ☑<br>FEAT 2A ☑<br>FEAT 3A ☑<br>FEAT 4A ☑<br>FEAT 5A ☑ | Cavity #2 ☑<br>All ☐<br><br>FEAT 1B ☐<br>FEAT 2B ☐<br>FEAT 3B ☐<br>FEAT 4B ☐<br>FEAT 5B ☐ | Cavity #3 ☑<br>All ☐<br><br>FEAT 1C ☐<br>FEAT 2C ☐<br>FEAT 3C ☐<br>FEAT 4C ☐<br>FEAT 5C ☐ || Cavity #4 ☑<br>All ☐<br><br>FEAT 1D ☐<br>FEAT 2D ☐<br>FEAT 3D ☐<br>FEAT 4D ☐<br>FEAT 5D ☐ |
| Special Features |||||
| OPTION 1 ☐ | OPTION 2 ☐ || OPTION 3 ☐ ||

FIG-1

METHOD AND DESIGNING AND MANUFACTURING RUBBER PROCESS TOOLING USING AN INTERFACE TO A CAD/CAM SOFTWARE PROGRAM

TECHNICAL FIELD OF THE INVENTION

The invention relates to computer-aided design (CAD) and computer-aided manufacturing (CAM) systems and methods and, more particularly, to methods for designing and manufacturing rubber (elastomer) process tooling used in manufacturing rubber (elastomer) tire components.

BACKGROUND OF THE INVENTION

The manufacture of a pneumatic tire involves several processes (extrusion, calendering, etc.), manufacturing components and machines. The present invention involves itself with methods for designing (creating, modifying) process tooling to manufacture tire components. An example of a tire component is a tread. Of particular interest are tire manufacturing tooling which are "preformers". Preformers are process tools made of one or multiple pieces of steel designed and machined to meet process specifications of tire manufacturing components in order to give a specific "shape" or "form" to the tire rubber components. Preformers include "splice bars", "roller dies", "calender rolls", "hot-former rolls", "dies", "inserts", etc.). The present invention will be described largely in the context of designing and machining a splice bar. A splice bar is a particular preformer used in extrusion rubber process, and includes a number of cavities and others features which must be machined. A process tool such as a splice bar is typically machined on a computer numeric control (CNC) machine.

The design of a rubber process tool such as a splice bar can be performed using a CAD/CAM software package, such as Pro/ENGINEER (tm). Old software is antiquated and new equipment more demanding of software, design and machine of rubber process tools such as performers now require more advanced CAD/CAM software such Pro/ENGINEER.

Pro/ENGINEER (tm) is a leading 3-D product development solution, enabling designers and engineers to bring superior products to market faster. Spanning the entire product development process, from creative concept through detailed product definition to serviceability, Pro/ENGINEER delivers measurable value to manufacturing companies of all sizes, and in all industries. It increases business competitiveness by providing a platform that delivers more innovative, appealing products to market, creates flexible products for customization, and increases design collaboration across the extended enterprise.

These solutions extend the value of the complete product definition available from Pro/ENGINEER by providing the ability to develop product creation deliverables such as mold components, NC (numerical control) toolpaths, and inspection programs. In all cases, Pro/ENGINEER data in its native form is used as the basis for deliverable development. This eliminates the need for any data translation and allows the deliverable to update to any design change. The capability to automatically accommodate design changes enables true collaboration within the product development team. Early work in the production environment for planning and optimization is always preserved and available for re-use and standardization as a consequence of the solution architecture.

Pro/ENGINEER will be referred to hereinafter as "Pro-E", simply as an example of a suitable, generic 3-D CAD/CAM software tool with which the present invention can interface. Although it is a very robust and capable tool, Pro-E is somewhat complicated to use, requiring much user training and development time. What is needed is a way of interfacing with and using the Pro-E tool, which is more user-friendly, quick and still effective to control error, for a given type of application.

Returning to the subject of computer-aided design (CAD), a number of systems are know for accepting inputs from users which are remotely located from the computer whereat the CAD software program resides and runs.

U. S. Pat. No. 6,392,117 (LSI Logic Corporation), incorporated in its entirety by reference herein, discloses a distributed computer aided design (CAD) system includes a CAD server station and one or more CAD client stations remote from the server station but connectable thereto via a communications medium such as an intranet or the Internet. The CAD server station includes a CAD tool for performing CAD tasks and a communications interface. The CAD client stations include display and data entry facilities for displaying a design parameter entry document to a user and for accepting design parameters entered by the user, as well as a communications interface for transmitting entered design parameters via the communications medium to the server station. The CAD tool at the server station is configured to receive the design parameters from the client station, to perform CAD tasks based on the design parameters and to return processed design data to the server station via the communications medium. The client station can include a workstation with a web browser capability. The server station can be configured to respond to a request from a client station to supply a design parameter input form.

Although the parameterization of designs is fairly commonplace in digital logic design, it is maybe less commonplace in mechanical systems.

The following published US Patent Applications are also of interest.

2002/0012007, which discloses an Internet based design/drafting system;

2002/0021277, which discloses an interface for controlling a graphical image;

2002/0010522, which discloses method and apparatus for home building;

2002/0035451, which discloses a computer-aided design (CAD) project system; and

2001/0047251, which discloses a CAD system which designs 3-D models.

BRIEF SUMMARY OF THE INVENTION

An overall object of the invention is to simplify and decrease the time needed by an operator/person (user) to design and machine rubber process tools, such as preformers.

According to the invention, an interface tool is provided for a user to interface with a CAD/CAM software package, such as Pro-E which is resident on the client computer or on a second server computer. The interface tool is resident on the client computer.

Parameters are input by the user onto web pages, and then are transferred to Pro-E by the interface tool. Pro-E outputs drawings, 3-D models and machining codes by using the information that was transferred from the interface tool.

The user can create or modify, and verify from various aspects, models of machineable physical items (products), such as "preformers" associated with rubber process tooling.

Pro-E can then create appropriate toolpaths and output the machining code for CNC (computerized numeric control) machines.

The server and client computer can be the same computer, or the client computer can be linked via the Intranet to the server computer, in which caser the design of a product can be accessible from many geographic locations.

A library is maintained at the client computer of a plurality (e.g., approximately 20) of generic models for machineable physical items (products), such as "preformers" for producing various tire rubber components. Each of these models may contain more than 1000 variables (parameters) that are output from the interface tool to Pro-E. Every one of these parameters is changeable by the user. However, every one of these parameters is set up by an administrator with a default output value, and they may never be seen by the user if it is not desired that they be changed.

On a general configuration page, the user selects which features and options he wishes to change. For all features and options selected, the user will see a page with the list of all the parameters of the features or options. These parameters may be dimensions of the model itself, dimensions of the features of the model such as cavities, manufacturing parameters and/or tooling parameters. For many of these values, a limited range of acceptable values is established beforehand by the administrator, and if the user goes outside of these ranges, an error message appears on the screen, preferably with the acceptable range for the parameter being shown, which leads the user to pick (select or enter) an acceptable values. Some picks are done with pull-down menus from a selectable list, and some picks are done by clicking on "radio buttons".

Once the user launches Pro-E from the interface, the user is presented with a preferred "stripped down" version of Pro-E, which has limited functionality or could be presented with a complete version. For example, a Pro-E "reader", which is already available. Using the stripped-down version, the only options that the user can use (besides a map key, which is for walking through the operations), are the abilities to rotate, pan and zoom the model to inspect it. Using the stripped-down version, the user may also take measurements of the model, change views on the model from a solid view to a hidden line view or wireframe view, or select from a list of saved views such as front, side, top, etc. Other than these relatively few functions, which can be taught to the user in a relatively short time (e.g., several minutes, versus several weeks), the user does not need to know or be skilled at any other functionality on Pro-E.

The areas of Pro/ENGINEER (tm) which are most used by the present invention are the "basic module" and the "manufacturing package" which are used to create the toolpaths and output the machining code to the CNC machines.

Previous methods for designing rubber process tooling such as preformers involved a CAD/CAM programmer spending numerous hours building a model with a multitude of parts to output machining code to the CNC machine. This was very time consuming procedure and required the person to have a lot of computer and CAD/CAM skills. The method of the present invention does not require the person to learn the CAD/CAM software, and allows him to concentrate on the job at hand. The advantage is that there is a significant faster turnaround, from days to minutes, from the tire designer to the extruder output. It also lowers the cost while decreasing the numbers of errors. With this method, the skill level of the operator is reduced, and a CAD/CAM programmer or a machinist is not required.

Generally, by using a Web Interface, the operator/person does not have to be trained to use CAD/CAM programs.

Other objects, features and advantages of the invention will become apparent in light of the description that follows.

BRIEF DESCRIPTION OF THE DRAWINGS

The structure, operation, and advantages of the invention will become further apparent upon consideration of the following description taken in conjunction with the accompanying drawing, wherein:

FIG. 1 is a screen shot of the interface tool of the present invention.

DETAILED DESCRIPTION OF THE INVENTION INCLUDING BEST MODE FOR PRACTICING THE INVENTION

Generally, the interface tool of the present invention can be running on the same computer which is running the CAD/CAM software (e.g., Pro E), but it is preferred that the interface tool is running on a separate computer which is geographically remote from the computer housing the CAD/CAM software, as long as the computers are in communication with one another so that the interface tool is capable of interacting with the CAD/CAM software. By way of example, the interface tool is running on a client computer (or station) which is connected with a server computer (or station) via a communications medium, which is preferably an intranet or the Internet. Other network mediums could be used. However, in the present computing environment, the use of an intranet or the Internet provides an ideal vehicle for implementing an example of the present invention.

By way of example, as illustrated in FIG. 2 of the aforementioned U.S. Pat. No. 6,397,117, the server station (22) comprises an intranet/internet interface (32) including a modem (33) for connection to the communications medium (24) via a link (23). A computer (30), which includes a central processing unit, associated main and mass storage memory and all the other typical attributes of a computer, supports a number of applications including a network monitor application (34), management applications (36) and a computer aided design tool (38), including design tool executables (37) (programs) and design tool libraries (39). One or more user stations (28) including a display, (possibly a local processor) and input/output devices can be provided for CAD tool designers/maintainers to create and maintain the CAD tool (38).

At a client station (26), a user is provided with a computer workstation (40) having a display (42), user input devices (44), a processor (46) with associated memory, etc, and a network interface 48 including a modem. The user's workstation 40 is also provided, in the preferred embodiment of the invention, with network browser software, which is stored in the workstation's memory and executed on the workstation's processors.

It will be noted that any number of client stations can be connected to the server station via the network (24), although the number of client stations which can make access at any one time to the server station will be limited by the bandwidth of the server station (22), and possibly the network (24).

The user may interact with a standard web page that captures his design requirements, for example by use of a software form. The form can be generated locally at the client station, or the form can be received from the server station when the user accesses a web page at that server station. This provides the advantage that the server station can keep the forms up-to-date, and the user receives the latest version of the form when he/she wishes to make use of CAD tool functions.

An Exemplary Design Process

The invention will now be described in terms of an exemplary process for designing and validating a splice bar, from the point where the user first sits at the machine to design the splice bar to the point where the user causes the CAD/CAM software to output code for use by a CNC machine.

The process is described in terms of a user designing a specific splice bar, using an interface tool, based on a generic splice bar design, which has previously been stored on the client computer. The interface tool of the present invention is embodied in software resident on the user's (client's) computer, which is in communication (e.g., via the Intranet or Internet) with a server computer. A full-featured CAD/CAM software package (e.g., Pro-E) is resident on the server computer or the client computer.

The interface tool presents forms and menus for selecting, entering and/or altering information, and initiating actions, in a format suitably having the familiar look and feel of Internet Explorer and conventional WebPages. The "pages" that are described hereinafter can be scripted using HTML, or any other suitable programming language. The output of the interface tool is essentially batch commands which are exported to the CAD/CAM software package for execution.

Step 1: "Login" Page

To commence designing the exemplary splice bar, the user first launches the interface tool, which brings up a "Login Page" where the user logs in, providing the user ID and password. The system is password protected to protect the models which are designed, as well as the user's work. In other words, access to the Interface and ProE is password protected. The data entry areas on the Login page include:

User ID

Password

Step 2: "User Homepage" Page

After logging in and providing a valid password, a "User Homepage" page is presented to the user. On this page, the user can select from among the following actions:

Create a new production model based on a master model.

Modify an existing production model.

The User Homepage displays, in conventional menu format, a list of production models which the user can choose from to edit the pages in order to modify some of the parameters. Generic model refers to the master ProE models with the default parameters. Production model refers to the list of value of the parameters input in the Interface to be passed to the Generic model in ProE. Here, "new" could be a choice which would be the equivalent of "create" a new production model from the default value. At startup, the system contains a few examples of production models which have been created by the administrator. As time goes on, additional production models which have been designed or edited by users can be added to the library, and appear on the list, or on a sub-list. At this time only the Interface has to be running locally or from a server. ProE may or may not be running.

Step 3: "General Configuration" Page

Once the user selects the model he wishes to create from the supplied list of master models, or the model he wants to modify from the production model list, he is presented with the "General Configuration" page. On the "General Configuration" page, the user gives the production model a name, and selects from menus for parameters such as for which process equipment the splice bar is designed (e.g. extruder line 1), number of rubber components to be realized with the preformer, type of preformer, etc. The General Configuration page is shown in FIG. 1.

This page presents to the user:

Model name, which is the name that the user has given the production model;

The ability to select, from a menu, the CNC machine upon which he intends the part to be machined.

The ability to select, from a menu, the extruder line the splice bar will be used at.

Information regarding the splice bar blank dimensions (e.g., size) which he has selected.

On this page, the user selects which of several features (always included in the model) and which options (special features that are optional on the model) he would like to modify or create by putting checks in the appropriate boxes. Some features have their parameters linked (presented on same line) so if the user wants to keep the link he only checks the first box of those features. The values of the features on the same line will be automatically populated thanks to the link. If the user wants different values he can check other boxes on the line to enter then specific values and overwrite the link. As each parameter has default value, the user only changes the parameter he needs to without having to type redundant information.

It may thus be seen that, at a first stage (or hierarchical level) in the process, the user is first presented with the ability to choose a part for designing, at a high level, in the General Configuration page which sets forth only the broad characteristics (features) of the item being designed.

When the General Configuration page is completed, the user clicks on the "next" button.

Step 4: "Feature" Pages

Clicking on "next" brings up a series of feature pages. For each feature checked in the General Configuration page, a corresponding page ("Feature Page") will appear after the user pushes "Next" on the previous page. On each of those pages, the user modifies the value of the different parameters defining that feature (pull-down menu, manually typing the input). These parameter values can also be changed by the user within a range set up by the administrator which is deemed acceptable (valid). If outside the acceptable range, an error message will appear, as discussed below. Each feature page preferably has pictures describing the different parameters of the features. User's changes dynamically update on those pictures.

It may thus be seen that, at this next stage (or hierarchical level) in the process, the user is presented with the ability set values/parameters for features of the item being designed.

Step 5: "Options" Page

There are options, in some models, to add extra (special) features. If these features are checked (Step 3) on the General Configuration page to be added, then a corresponding page ("Options Page") will appear after the user clicks the "Next" button on the previous page. On each of those pages, the user modifies the value of the different parameters defining that feature (pull-down menu, manually typing the input). For most of the parameters the administrator has set up a valid range. If the user's input is outside the acceptable range, an error message will appear, as discussed below. Each feature page has pictures describing the different parameters of the features.

It may thus be seen that, at this next stage (or hierarchical level) in the process, the user is presented with the ability set values/parameters for options of the item being designed.

Step 6: "Machining Passes" Page

Once all the features (Step 4) and options (Step 5) have been set up, the user clicks on "Next" to go to the next step. On the Machining Passes Page the user decides which feature (e.g. cavity) he would like to cut by checking the appropriate boxes. Then, the user can click on "view passes", which will bring up a "Pass Selection" page, described in Step 7.

Step 7: "Pass Selection" Page

On this page, the user can select which passes he would like to "cut"—for example, for "Feature 1". He is presented with information regarding the basic setups which are used, displayed next to each pass. If he does not like any of these values, the can be modified by selecting edit. These machining parameters control the manner, in which this particular machining pass will be set up, and include feed rates, spindle speeds, fixture offsets, etc.

A menu displays a selection of passes which may be made by the CNC machine, and main parameter as the tool, tool diameter, tool offset, spindle speed, feed rate, plunge rate, and stepover (collectively referred to as "general tooling parameters") for each pass. Any of these general tooling parameters (e.g., feed rate) may be edited by the user.

Step 8: "Tool Parameter" Page

On this page, all parameters (including not only the general tooling parameters discussed above, but more detailed tooling specifics) relating to the tool can be viewed, and changed. Many of these values are left to the individual machinist, but some are controlled (limited) by the CNC machine settings, such as the minimum and maximum spindle speeds. These limits are set beforehand by the administrator.

Next, the user saves the change he made or cancels it and clicks on the "next" button to go back to the Machining Passes page and clicks on the "next" button once again to go to the Launch ProE page (Step 9).

Having thus designed and checked over the part, using the interface tool on his own computer, the user may now launch the Pro-E program which, as mentioned above, may be either located remote from the user on a server or on the client computer (preferred mode depends on the number of clients and number of ProE license available).

Step 9: "Launch Pro-E" Page

Once all the values are entered and checked, the ProE button on the manufacturing page will launch Pro-E, bring the correct model into session, and regenerate the generic model with the values entered by the user. It also brings a map key into session that will walk the user through the appropriate steps to output the CNC code. This page is also referred to as "Manufacturing Interface".

In other words, the user causes Pro-E to launch (if it is not already running) on the server or client computer. The information that the user has generated on the interface tool is transmitted as a batch file to Pro-E, which executes the batch file. The first thing that Pro-E will do is to bring up (regenerate) the generic model which was being worked on by the user, then apply the parameters generated by the user to the generic model to personalize the model to the user's specifications and become a production model.

If the user detects an error when looking at the 3-D model and controlling dimensions, then he can go back to the interface, change the appropriate values, and regenerate the model by clicking the a button on the Manufacturing Interface page. The user then can check if the error is fixed. This allows all errors to be made on the computer, rather in the steel, which is not fixable, causing scrap.

Step 10: "Tool Path Shown" Page

Once the design is acceptable, the user can begin the machining passes by selecting the "resume" button on the map key. This will cause Pro-E to output the tool path and to display it on the screen. Once again, before proceeding to the next step, the user can rotate the model and examine the output before continuing.

If the user detects an error in the tool path (e.g. path going through a feature, or through the wrong part, wrong starting point), then he can go back to the interface (activate the interface windows and travelling through the different pages using the Previous/Next button) and changes the appropriate values, and regenerates the model by clicking the a button on the Manufacturing Interface page. The user is then back to Step 9.

Step 11: "CNC Code processed" Page

As long as the tool path, the user can then hit resume on the map key one more time to output the CNC code to the machine. This step shows if there are any warnings to the user when it runs the output.

It should be understood that no metal has actually been cut at this point in time, all machining operations which have been referred having been performed "virtually" by Pro-E.

Step 12:

Once the model has been setup as desired following the previous steps in the interface tool, and physically cut on a machine (e.g. machining center, milling machine, lathe, EDM), the production model may be copied in the interface tool to cut additional similar preformers with minor changes. This allows numerous preformers to be "cut" with little design time.

Output Parameters

In the Step 10 (described here in above), Pro-E is launched and all of the parameters generated by the interface tool are shipped to Pro-E for creating the model. This may include, for example, about 1000 parameters output from the interface tool to Pro-E for a particular model.

A few exemplary parameters output from the interface tool to Pro-E are:

FEATURE_1_WIDTH=50

OPTION_1=NO

SPINDLE SPEED=1000

In summary, the interface tool of the present invention presents the user with forms (pages) for:

- calling up a generic model of a part which has default features and characteristics,
- setting values for features of the part being designed,
- setting values/parameters for options for the part being designed,
- viewing machining configurations Then, having designed and checked the part being designed, the user can:

- launch a stripped-down CAD/CAM software program,
- inspect the modeled part,
- make corrections by returning to previous steps, if necessary, and
- generate CNC code for machining the part.

The operation of the interface tool, insofar as converting user inputs to batch commands for the CAD/CAM software package, is straightforward, and well within the purview of one having ordinary skill in the art to which the present invention most nearly pertains, in light of the preceding description.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed is:

1. Method for designing and manufacturing process tooling used for manufacturing rubber (elastomer) components comprising:

providing a full-featured CAD/CAM software program on a first computer;

providing an interface tool on a second computer which is separate from the first computer;

providing a stripped-down version of the CAD/CAM software program on the second computer;

at the interface tool, calling up a generic model of a process tool which has default features and characteristics;

at the interface tool, setting values for features of the process tool being designed, from the interface tool, exporting output parameters to the first computer as inputs to the full-featured CAD/CAM software, modeling the process tool on the full-featured CAD/CAM software comprising a modeled process tool and outputting parameters of the model to the first computer; and launching the stripped-down version of the CAD/CAM software program at the second computer for viewing the modeled process tool.

2. Method, according to claim 1, wherein:

the second computer is remote from the first computer.

3. Method, according to claim 1, wherein:

the second computer is connected via the Internet to the first computer.

4. Method, according to claim 1, further comprising:

at the interface tool, setting values/parameters for options for the part being designed.

5. Method, according to claim 4, further comprising:

at the interface tool, viewing machining configurations.

6. Method, according to claim 5, further comprising:

at the interface tool, inspecting the modeled part.

7. Method, according to claim 6, further comprising:

at the interface tool, making corrections by returning to previous steps.

8. Method, according to claim 6, further comprising:

causing the full-featured CAD/CAM software program to generate CNC code for machining the process tool.

9. Method, according to claim 1, wherein:

the rubber component is a tire rubber component.

10. Method, according to claim 1, wherein:

the process tool is a preformer.

11. Method, according to claim 10, wherein the preformer comprises one of a splice bar, roller die, calender roll, hotformer roll, die, or insert.

12. Method, according to claim 1, further comprising:

setting values/parameters for options for the process tool being designed.

13. Method, according to claim 10, further comprising:

if necessary, making corrections by returning to previous steps.

14. Method, according to claim 12, further comprising:

maintaining a library of generic process tools.

15. Method for designing and manufacturing process tooling used for manufacturing rubber (elastomer) components comprising:

providing a full-featured CAD/CAM software program on a first computer;

providing a stripped-down version of the CAD/CAM software program on a second computer;

providing an interface tool on the second computer;

providing a library of generic process tools at the second computer, at the interface tool, a user commences designing by calling up one of the generic models of process tools which has default features and characteristics;

then, using the interface tool, the user sets values for the features and characteristics of the process tool being designed, then, the user causes the interface tool to export output parameters for the design to the first computer as inputs to the full-feature CAD/CAM software running on the first computer, then, on the first computer, the full-featured CAD/CAM software thereby causing the process tool to be modeled and generating parameters for the modeled process tool, then, sending the parameters of the modeled process tool to the second computer, receiving the parameters of the modeled process tool at the second computer and, using the stripped-down version of the CAD/CAM software program at the second computer, the user viewing the modeled process tool, and then, if necessary, the user making corrections to the design by returning to previous steps of setting new values for features and characteristics, exporting output parameters, causing the process tool to modeled, sending the parameters of the modeled process tool, receiving the parameters of the modeled process tool, viewing the modeled process tool.

16. Method, according to claim 15, further comprising:

when the user is satisfied with the design, causing the full-featured CAD/CAM software program to generate CNC code for machining the process tool.

17. Method, according to claim 15, wherein:

the rubber component is a tire rubber component.

18. Method, according to claim 15, wherein:

the process tool is a preformer.

19. Method, according to claim 18, wherein the preformer comprises one of a splice bar, roller die, calender roll, hotformer roll, die, or insert.

* * * * *